(12) United States Patent
Luo

(10) Patent No.: US 11,145,069 B2
(45) Date of Patent: Oct. 12, 2021

(54) TARGET TRACKING METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Wenhan Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 200 days.

(21) Appl. No.: 16/538,310

(22) Filed: Aug. 12, 2019

(65) Prior Publication Data
US 2019/0362503 A1 Nov. 28, 2019

Related U.S. Application Data

(63) Continuation of application No. PCT/CN2018/095473, filed on Jul. 12, 2018.

(30) Foreign Application Priority Data

Jul. 14, 2017 (CN) .......................... 201710573025.4

(51) Int. Cl.
*G06T 7/215* (2017.01)
*G06K 9/00* (2006.01)
(Continued)

(52) U.S. Cl.
CPC .............. *G06T 7/215* (2017.01); *G06F 17/18* (2013.01); *G06K 9/00523* (2013.01);
(Continued)

(58) Field of Classification Search
CPC ........... G06T 7/215; G06T 2207/30241; G06T 2207/10016; G06T 7/246; G06T 7/292;
(Continued)

(56) References Cited

U.S. PATENT DOCUMENTS

| | | | | |
|---|---|---|---|---|
| 5,710,875 A | * | 1/1998 | Harashima | .............. G06T 15/10 345/419 |
| 6,754,389 B1 | * | 6/2004 | Dimitrova | .......... G06K 9/00228 382/224 |

(Continued)

FOREIGN PATENT DOCUMENTS

| | | |
|---|---|---|
| CN | 104376576 A | 2/2015 |
| CN | 106875421 A | 6/2017 |

(Continued)

OTHER PUBLICATIONS

Luo Wenhan: May 1, 2016 "Generic Multiple Object Tracking", Imperial College London, pp. 1-120 (Year: 2016).*

(Continued)

*Primary Examiner* — Ishrat I Sherali
(74) *Attorney, Agent, or Firm* — Oblon, McClelland, Maier & Neustadt, L.L.P.

(57) ABSTRACT

Aspects of the disclosure provide an apparatus for target tracking including processing circuitry that obtains a plurality of target instances according to a target detection on image data. Each of the plurality of target instances corresponds to one of a plurality of tracked targets. The processing circuitry determines a plurality of trajectory segments, each of which indicates a trajectory of a subset of the target instances corresponding to a same tracked target. The processing circuitry determines feature information of the plurality of trajectory segments. The processing circuitry performs clustering on specified trajectory segments of the plurality of trajectory segments according to the feature information of the specified trajectory segments, to obtain a type distribution of the specified trajectory segments. The processing circuitry determines, according to the type distribution of the specified trajectory segments, a target track- (Continued)

ing result including a same type of the specified trajectory segments.

20 Claims, 11 Drawing Sheets

(51) Int. Cl.
*G06F 17/18* (2006.01)
*G06K 9/62* (2006.01)

(52) U.S. Cl.
CPC ....... *G06K 9/00536* (2013.01); *G06K 9/6215* (2013.01); *G06T 2207/30241* (2013.01)

(58) Field of Classification Search
CPC ................ G06F 17/18; G06K 9/00523; G06K 9/00536; G06K 9/6215; G06K 9/6204; G06K 9/00342; G06K 9/00771
USPC ......................................................... 382/103
See application file for complete search history.

(56) References Cited

U.S. PATENT DOCUMENTS

| | | | | |
|---|---|---|---|---|
| 8,305,930 | B2 * | 11/2012 | Park | G01S 5/0294 370/254 |
| 8,599,252 | B2 * | 12/2013 | Komoto | G06T 7/215 348/135 |
| 9,442,176 | B2 * | 9/2016 | Bulan | G08G 1/096716 |
| 9,562,965 | B2 * | 2/2017 | Georgy | G01S 5/0294 |
| 2010/0090823 | A1 | 4/2010 | Park et al. | |
| 2014/0372073 | A1 | 12/2014 | Georgy et al. | |

FOREIGN PATENT DOCUMENTS

| | | |
|---|---|---|
| CN | 106934339 A | 7/2017 |
| CN | 107392937 A | 11/2017 |
| JP | 2006-513468 A | 4/2006 |
| JP | 2014-504410 A | 2/2014 |
| JP | 2015-167017 A | 9/2015 |
| JP | 2016-162256 A | 9/2016 |
| JP | 2017-123087 A | 7/2017 |
| WO | 2014/080613 | 5/2014 |

OTHER PUBLICATIONS

Kandare et al., Trajectory Type Prediction and Multi-Target Tracking, 2019 IEEE, 978-1-7281-0137-8/19, pp. 1-6. (Year: 2019).*
Korean Office Action dated Dec. 8, 2020 in Application No. 10-2019-7028566, citing document AX therein. (6 pages).
Topkaya et al., "Tracklet clustering for robust multiple object tracking using distance dependent Chinese restaurant processes," SIViP, Sep. 19, 2015 (8 pages).
Japanese Office Action dated Oct. 20, 2020 in Application No. 2019-547413 with English translation, citing documents AO-AT therein. (9 pages).
European Search Report dated Mar. 12, 2021 in Application No. 18832895.9, citing document AX therein. (12 pages).
Luo, "Generic Multiple Object Tracking," Imperial College of Science, Technology and Medicine, May 1, 2016 (172 pages).
International Search Report dated Sep. 14, 2018 in Application No. PCT/CN2018/095473, citing references AA-AB and AO-AR therein, 5 pages, with English Machine Translation.
Written Opinion dated Sep. 14, 2018 in Application No. PCT/CN2018/095473, 4 pages.

* cited by examiner

US 11,145,069 B2

TARGET TRACKING METHOD AND APPARATUS, ELECTRONIC DEVICE, AND STORAGE MEDIUM

RELATED APPLICATION

This application is a continuation of International Application No. PCT/CN2018/095473, filed on Jul. 12, 2018, which claims priority to Chinese Patent Application No. 201710573025.4, entitled "TARGET TRACKING METHOD AND APPARATUS, AND ELECTRONIC DEVICE" filed on Jul. 14, 2017. The entire disclosures of the prior applications are hereby incorporated by reference in their entirety.

FIELD OF THE TECHNOLOGY

This application relates to the field of computer technologies, and in particular, to a target tracking method and apparatus, an electronic device, and a storage medium.

BACKGROUND OF THE DISCLOSURE

As image capturing devices are becoming more abundant, a large quantity of image capturing devices, such as cameras, can be deployed both indoors and outdoors to perform target detection (or tracking by detection) on tracked targets by using image data collected by the image capturing devices at any time, thereby tracking a target.

However, in a process of tracking the target, two different tracked targets may be obtained through target detection because of an attitude change of the tracked targets (for example, people). Alternatively, a tracked target may disappear or reappear due to discontinuous collection of image data, which still leads to two different tracked targets obtained through target detection.

The foregoing shows that the related target tracking still has a disadvantage of low accuracy.

SUMMARY

Aspects of the disclosure provide methods and apparatuses for target tracking. In some examples, an apparatus for target tracking includes processing circuitry.

The processing circuitry obtains, according to a target detection on image data, a plurality of target instances. Each of the plurality of target instances corresponds to one of a plurality of tracked targets. The processing circuitry further determines a plurality of trajectory segments. Each of the plurality of trajectory segments indicates a trajectory of a subset of the target instances corresponding to a same tracked target of the plurality of tracked targets. The processing circuitry determines feature information of the plurality of trajectory segments. The processing circuitry performs clustering on specified trajectory segments of the plurality of trajectory segments according to the feature information of the specified trajectory segments, to obtain a type distribution of the specified trajectory segments. The processing circuitry determines, according to the type distribution of the specified trajectory segments, a target tracking result including a same type of the specified trajectory segments.

In some embodiments, the processing circuitry determines target feature information of the target instances associated with one of the plurality of trajectory segments. The processing circuitry determines, according to the target feature information, local feature information and global feature information of the target instances associated with the one of the plurality of trajectory segments. The processing circuitry determines the feature information of the one of the plurality of trajectory segments according to the local feature information and the global feature information.

In some embodiments, the processing circuitry obtains one of the plurality of target instances according to annotation information of a plurality of deformable parts of a tracked target of the plurality of tracked targets in the image data. The tracked target corresponds to the one of the plurality of target instances. The processing circuitry obtains, for one of the target instances associated with the one of the plurality of trajectory segments, a visual feature vector and a structure feature vector of the tracked target corresponding to the one of the target instances. The visual feature vector is a histogram feature vector that is extracted from the annotation information of the plurality of deformable parts of the tracked target. The structure feature vector is based on location deviation values between one of the plurality of deformable parts and another one of the plurality of deformable parts of the tracked target. The processing circuitry determines the target feature information of the one of the target instances according to the visual feature vector and the structure feature vector of the tracked target corresponding to the one of the target instances.

In some embodiments, the processing circuitry determines the local feature information according to the visual feature vector of the tracked target corresponding to the one of the target instances associated with the one of the plurality of trajectory segments. The processing circuitry determines an average value of structure feature vectors and a covariance matrix of the structure feature vectors. The structure feature vectors corresponds to the target instances associated with the one of the plurality of trajectory segments. The processing circuitry determines the global feature information according to the average value and the covariance matrix of the structure feature vectors.

In some embodiments, the processing circuitry calculates, for each of at least one predefined type of trajectory segment, a likelihood between the respective predefined type of trajectory segment and one of the specified trajectory segments according to the feature information of the one of the specified trajectory segments. The processing circuitry calculates, according to the likelihoods between the at least one predefined type of trajectory segment and the one of the specified trajectory segments, a plurality of probabilities that the one of the specified trajectory segments follows a uniform distribution in the at least one predefined type of trajectory segment. The processing circuitry classifies the one of the specified trajectory segments into one of the at least one predefined type corresponding to a maximum probability in the plurality of probabilities.

In some embodiments, the processing circuitry determines whether a first target instance associated with the respective predefined type of trajectory segment and a second target instance associated with the one of the specified trajectory segments overlap in time. The processing circuitry determines the likelihood between the respective predefined type of trajectory segment and the one of the specified trajectory segments to be zero when the first target instance and the second target instance are determined to overlap in time.

In some embodiments, the processing circuitry obtains a predefined trajectory segment associated with the respective predefined type of trajectory segment. A first target instance associated with the predefined trajectory segment is closest in time to a second target instance associated with the one of the specified trajectory segments. The processing circuitry calculates a local similarity between the one of the specified trajectory segments and the predefined trajectory segment associated with the respective predefined type of trajectory segment according to local feature information of the one of the specified trajectory segments and local feature information of the predefined trajectory segment associated with the respective predefined type of trajectory segments. The processing circuitry calculates a global similarity between the respective predefined type of trajectory segment and the one of the specified trajectory segments according to the global feature information of the one of the specified trajectory segments and a type parameter of the respective predefined type of trajectory segment. The processing circuitry calculates the likelihood between the respective predefined type of trajectory segment and the one of the specified trajectory segments according to the local similarity and the global similarity.

In some embodiments, the processing circuitry determines whether an iteration quantity of the clustering satisfies a preset iteration threshold. The processing circuitry updates the type parameter of the respective predefined type of trajectory segment when the iteration quantity of the clustering is determined not to satisfy the preset iteration threshold. The processing circuitry calculates a likelihood between the updated respective predefined type of trajectory segment and the one of the specified trajectory segments according to the feature information of the one of the specified trajectory segments.

Aspects of the disclosure also provide a non-transitory computer-readable medium storing instructions which when executed by at least one processor cause the at least one processor to perform any of the methods for target tracking.

BRIEF DESCRIPTION OF THE DRAWINGS

The accompanying drawings, which are incorporated herein and constitute a part of this specification, illustrate embodiments consistent with this application and, together with the description, serve to explain the principles of this application.

DESCRIPTION OF EMBODIMENTS

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. Implementations described in the following exemplary embodiments are examples of the apparatus and method that are detailed in claims and that are consistent with some aspects in this application.

Figure 1:
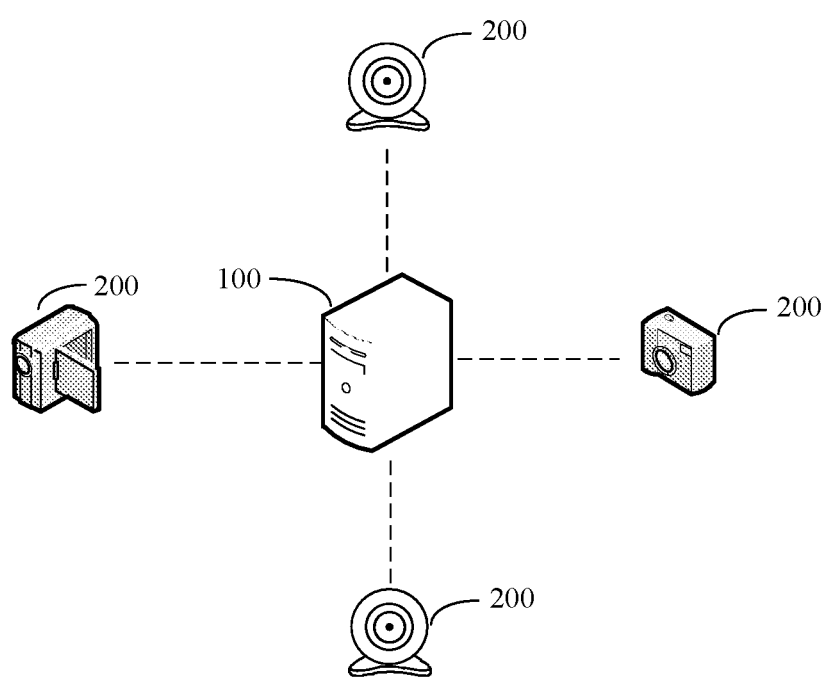
FIG. 1 is a schematic diagram of an implementation environment according to this application.

FIG. 1 is a schematic diagram of an implementation environment of a target tracking method. The implementation environment includes a server 100 and several image capturing devices 200 disposed everywhere.

The image capturing device 200 may be an electronic device for collecting image data, such as cameras, video recorders, video cameras, and the like. Correspondingly, the image data includes but is not limited to a video, a photo, and the like.

In this implementation environment, the server 100 obtains, by interacting with the image capturing devices 200, the image data collected by the image capturing devices 200, and performs target detection on tracked targets by using the image data to track a target.

Figure 2:
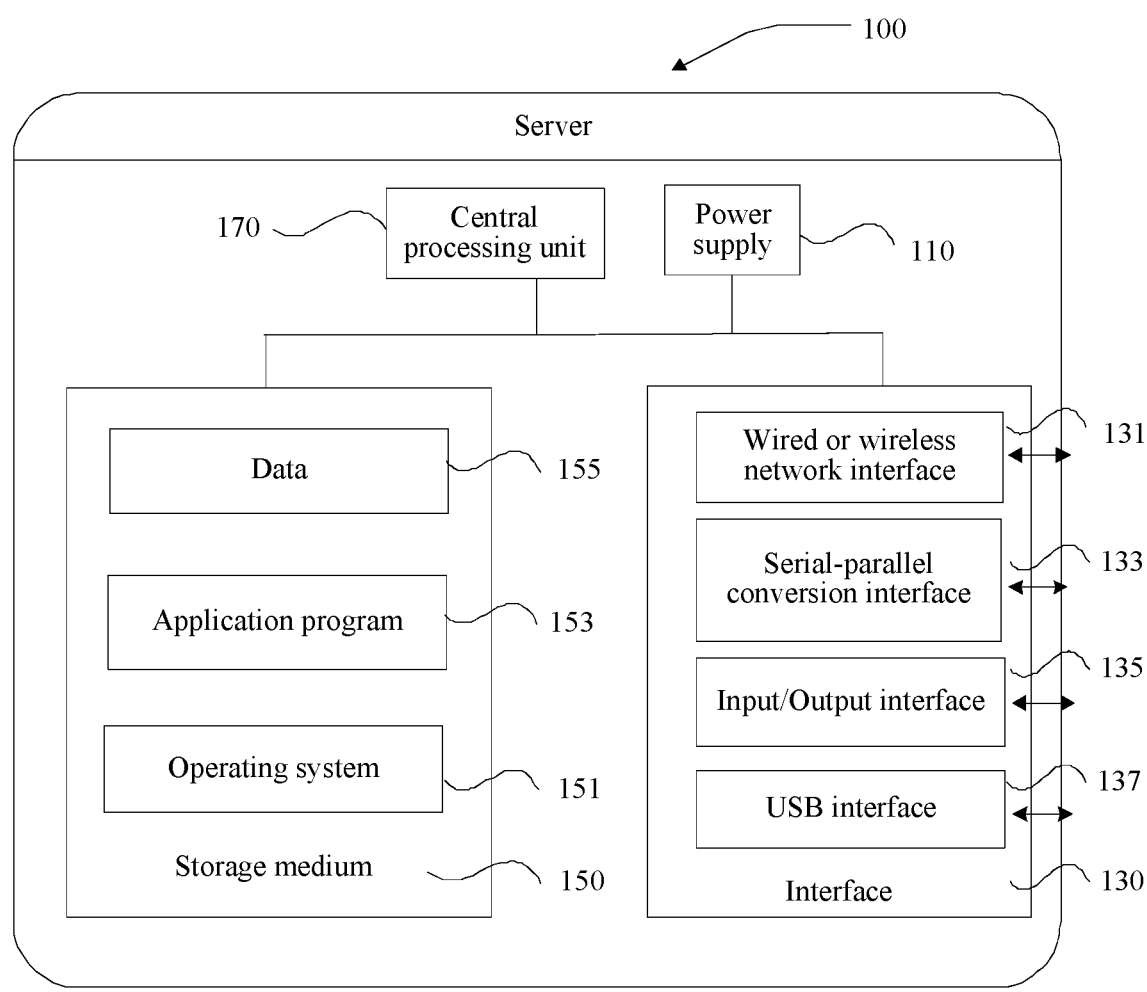
FIG. 2 is a schematic block diagram of hardware of a server according to an exemplary embodiment.

FIG. 2 is a schematic block diagram of hardware of a server 100 according to an exemplary embodiment. It is noted that the server 100 is only an example adapted to this application, and is not intended to suggest any limitation as to the scope of use of this application. The server 100 may not be explained as being dependent on or needing to have one or more components of the exemplary server 100 shown in FIG. 2.

A hardware structure of the server 100 can vary greatly due to different configurations or performance. As shown in FIG. 2, the server 100 includes a power supply 110, an interface 130, at least one storage medium 150, and at least one central processing unit (CPU) 170.

The power supply 110 is configured to provide an operating voltage for each hardware device on the server 100.

The interface 130 includes at least one wired or wireless network interface 131, at least one serial-parallel conversion interface 133, at least one input/output interface 135, at least one USB interface 137, and the like, and is configured to communicate with an external device.

The storage medium 150, as a carrier of resource storage, may be a random storage medium, a magnetic disk, an optical disc, or the like. Resources stored on the storage medium 150 include an operating system 151, an application program 153, data 155, and the like, and storage modes may be transitory storage or permanent storage. The operating system 151 is used for managing and controlling various hardware devices and the application program 153 on the server 100, and calculating and processing the massive data 155 by the central processing unit 170. The operating system 151 may be Windows Server™, Mac OS X™, Linux™, FreeBSD™, and the like. The application program 153 is a computer program that performs at least one specific task based on the operating system 151, and may include at least one module (not shown in FIG. 2). Each module can contain a series of operation instructions for the server 100. The data 155 can be photos, pictures, and the like stored on the magnetic disk.

The central processing unit 170 may include one or more processors (e.g., processing circuitry) and is configured to communicate with the storage medium 150 through a bus, for calculating and processing the massive data 155 in the storage medium 150.

As described in detail above, the server 100 applicable to this application reads, by using the central processing unit 170, a series of operation instructions stored in the storage medium 150, to track a target.

In addition, the technical solutions of this application can also be realized by a hardware circuit or a hardware circuit in combination with a software instruction. Therefore, realization of this application is not limited to any specific hardware circuit, software, and a combination thereof.

Figure 3:
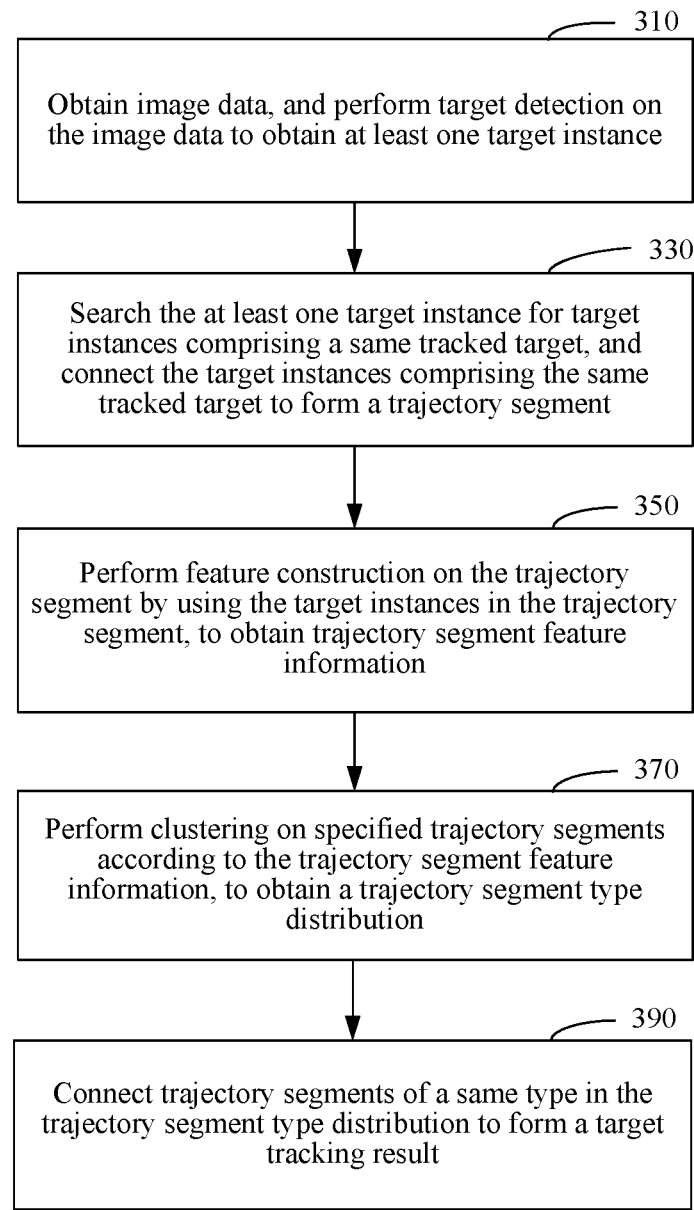
FIG. 3 is a flowchart of a target tracking method according to an exemplary embodiment.

Referring to FIG. 3, in an exemplary embodiment, a target tracking method is applicable to the server 100 in the implementation environment shown in FIG. 1. The server 100 may have the hardware structure shown in FIG. 2 in the exemplary embodiment.

As shown in FIG. 3, the target tracking method may be performed by the server 100, and may include the following steps:

Step 310. Obtain image data, and perform target detection on the image data to obtain at least one target instance.

The image data includes dynamic image data and static image data. The dynamic image data refers to a plurality of image frames, such as a video, while the static image data may be a static image including one frame, such as a picture. Based on this, the target tracking in this embodiment may be carried out based on a video including multi-frame images or a picture of a single-frame image.

The image data may come from image data collected by an image capturing device in real time, or may be image data pre-stored in the server. That is, the server may process the image data in real time after the image data is collected by the image capturing device, or the server may pre-store the image data and then process the image data. For example, the server processes image data when the server processes fewer tasks or at a time specified by an operator. Therefore, the image data obtained in this application may be image data collected by an image capturing device at present, or image data pre-stored in the server, that is, image data obtained by invoking an image capturing devices at a historical time, which is not limited herein.

The image capturing devices may be located everywhere, such as client devices, for example, in a corner of a ceiling inside a building, on a lamp post outside a building, and of an intelligent robot. Correspondingly, the image data may be any image in any scene where an image capturing device is disposed, any image inside a building, or any image outside a building, which is not limited herein.

The tracked target refers to any object on an image in any scene, such as a person, a car, or a mobile phone in the image, which is not limited herein.

The target detection of the image data is realized by using a target detection model. For example, the target detection model may be a deformable-part model, a single Gaussian model, a mixture Gaussian model, or the like, which is not limited herein. The target detection model is pre-created by the server before performing target detection on the image data.

It may be understood that, because the image data is any image in any scene where an image capturing device is deployed, sometimes, some images include one tracked target, some images include a plurality of tracked targets, and some images include no tracked target. Therefore, the target instance refers to image data including one tracked target.

It is noted that based on same image data, possibly no target instance can be obtained, that is, there is no tracked target in an image indicated by the image data, or a plurality of target instances may be obtained, that is, an image indicated by the image data contains a plurality of tracked targets, and each tracked target corresponds to one target instance.

It is further noted that, regardless how many target instances can be obtained from image data, the target instances overlap with each other in time. That is, a plurality of target instances included in image data are obtained from image data collected by the image capturing devices at a same collection time.

Therefore, at least one target instance may be obtained through the target detection performed on the image data by using the pre-created target detection model, where the at least one target instance contains one tracked target.

Further, because the image data may be a video of a plurality of frames or a picture of a single frame, target detection is performed on the image data in frame units, that is, one frame of image is used as input of the target detection model to implement a target detection process of the image data.

Step 330. Search the at least one target instance for target instances including a same tracked target, and connect the target instances including the same tracked target to form a trajectory segment.

First, it is noted that, a preset tracking algorithm, such as a KLT algorithm, may be used for performing global search on all tracked targets included in many target instances, to track a tracked target, that is, to find same tracked targets in many target instances.

Therefore, target instances including a same tracked target may be obtained by using the preset tracking algorithm, and then all target instances including a same tracked target may be connected to form a trajectory segment.

For example, a target instance A1 includes a tracked target A, a target instance A2 includes a tracked target B, and a target instance A3 includes a tracked target A. Correspondingly, a trajectory segment 1 is formed by connecting the target instances A1 and A3 including the tracked target A, and a trajectory segment 2 is formed by connecting the target instance A2 including the tracked target B.

It is understood that the image data is collected in chronological order, that is, the target instances are in chronological order.

Therefore, when a trajectory segment is obtained, all target instances including a same tracked target are connected in chronological order.

Still in the foregoing example, the first target instance of the trajectory segment 1 is A1, and the second target instance is A3. It is noted that, as time goes on, a quantity of target instances included in the trajectory segments increases, for example, the third target instance, the fourth target instance, . . . , the last target instance is added to the trajectory segment 1 in time order.

Step 350. Perform feature construction on the trajectory segment by using the target instances in the trajectory segment, to obtain trajectory segment feature information.

The trajectory segment feature information is used for accurately describing an entire and/or a part of the trajectory segment, to uniquely identify the trajectory segment in a form of information. It is understood that, if the target instances in the trajectory segment include different tracked targets, the trajectory segment are also different, which makes the trajectory segment feature information different as well.

Therefore, after a trajectory segment is formed by connecting target instances including a same tracked target, corresponding trajectory segment feature information may be obtained by using the target instances in the trajectory segment.

Specifically, the trajectory segment feature information is obtained by performing feature construction on the trajectory segment by using the target instances in the trajectory segment.

Further, the feature construction includes but is not limited to, target feature construction on the target instances, and local feature construction and global feature construction on the trajectory segment. Correspondingly, the trajectory segment feature information includes but is not limited to target feature information, local feature information, and global feature information.

Still further, the target feature information is related to a tracked target included in a corresponding target instance. The local feature information is related to at least one target instance in a corresponding trajectory segment. For example, the local feature information is related to the first target instance and the last target instance in the trajectory segment. The global feature information is related to all target instances in a corresponding trajectory segment.

Step 370. Perform clustering on specified trajectory segments according to the trajectory segment feature information, to obtain a trajectory segment type distribution.

In this embodiment, the clustering refers to a process of classifying the specified trajectory segments into a plurality of different types according to different tracked targets, that is, each type of trajectory segments corresponds to a tracked target through clustering.

It is noted that, the specified trajectory segment are trajectory segments that need to be clustered, which may be all of the trajectory segments obtained through step 330, or just any few of the trajectory segments that need to be clustered.

As described above, if target instances in trajectory segments include different tracked targets, the trajectory segments are also different, which leads to different trajectory segment feature information. In other words, the trajectory segment feature information may be used to represent a tracked target. In this way, the corresponding trajectory segment feature information has high similarity or even consistency, regardless that the tracked targets appear in which scenes, that is, which collected image data, or target instances that the tracked targets are included.

Therefore, the trajectory segments can be clustered through the trajectory segment feature information. To be specific, for extremely similar or even consistent trajectory segment feature information, target instances included in corresponding trajectory segments may be regarded as including a same tracked target, that is, the corresponding trajectory segments belong to a same type. Otherwise, for non-similar or inconsistent trajectory segment feature information, target instances in the corresponding trajectory segments may be regarded as including different tracked targets, that is, the corresponding trajectory segments belong to different types.

Based on the above, the trajectory segment type distribution refers to trajectory segments included in different types and a quantity of the trajectory segments. Different types are for different tracked targets. For example, for all trajectory segments belonging to a type A, tracked targets included in target instances is B, and for all trajectory segments belonging to a type C, tracked targets included in target instances is D.

For example, a Dirichlet mixture model is used for performing clustering on the specified trajectory segments. Specifically, the trajectory segment feature information corresponding to the specified trajectory segments is used as an input of the Dirichlet mixture model. The Dirichlet mixture model is used for performing clustering on the specified trajectory segments, to output a type of the specified trajectory segments. Further, the trajectory segment type distribution may be output by inputting the trajectory segment feature information for a plurality of specified trajectory segments.

In an embodiment, a clustering algorithm used for performing clustering on the trajectory segments may be flexibly adjusted to improve target tracking accuracy.

In the foregoing process, exclusive constraints of the target tracking are realized by performing clustering, that is, same tracked targets definitely belong to a same type, which provides a reliable guarantee for target tracking accuracy simply and effectively.

Step 390. Connect trajectory segments of a same type in the trajectory segment type distribution to form a target tracking result.

A trajectory segment is formed by connecting at least one target instance including a same tracked target. Further, based on the foregoing steps, for trajectory segments classified into a same type, target instances include a same tracked target. Therefore, the target tracking result formed by connecting the trajectory segments of the same type is also definitely based on a same tracked target. That is, the target tracking result corresponds to a unique tracked target, thereby accurately tracking a target.

Further, a plurality of targets can be tracked for a plurality of target tracking results formed by connecting different types of trajectory segments.

A connection for the target tracking result is carried out in chronological order of the trajectory segments. For example, the last target instance of the trajectory segment 1 is prior to the first target instance of the trajectory segment 2 in time. In this case, that is, the trajectory segment 1 is earlier than the trajectory segment 2 in time. Correspondingly, in the target tracking result, the trajectory segment 1 is connected before the trajectory segment 2 is connected.

Through the foregoing process, under the action of the trajectory segment feature information, a plurality of trajectory segments may be classified based on a same tracked target, to obtain a target tracking result of the tracked target. Therefore, in the process of target tracking, regardless whether the tracked target disappears or reappears, multi-target tracking may be performed on any plurality of tracked targets according to a requirement.

Figure 4:
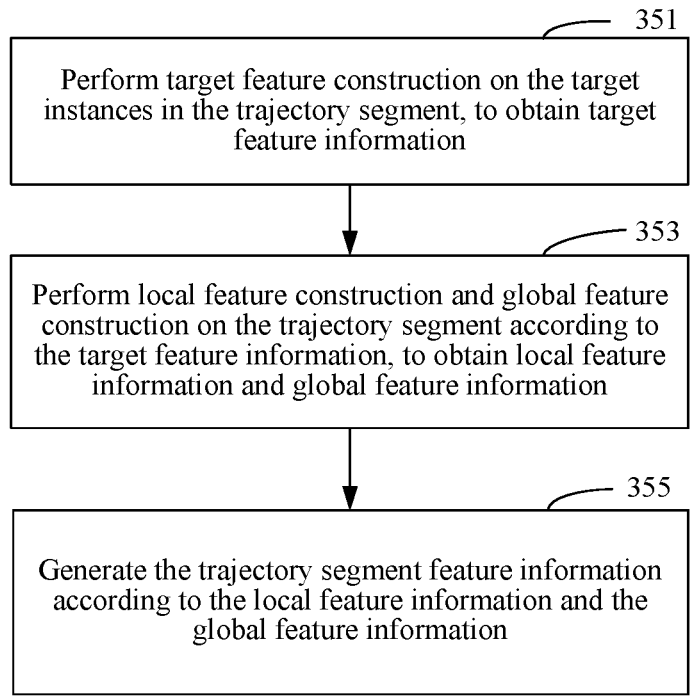
FIG. 4 is a flowchart of an embodiment of step 350 in the embodiment corresponding to FIG. 3.

Referring to FIG. 4, in an exemplary embodiment, step 350 may include the following steps:

Step 351. Perform target feature construction on the target instances in the trajectory segment, to obtain target feature information.

The target feature information is used for accurately describing the target instance through feature construction of the target instance. Further, the target feature information is related to a tracked target including in a corresponding target instance, thereby uniquely identifying the tracked target in a form of information.

It is understood that, different tracked targets leads to different target feature information. For example, if the tracked target is a person in the image, the target feature information may include a visual feature vector and a structure feature vector of the person; if the tracked target is a vehicle in the image, the target feature information may include a plate number; if the tracked target is a mobile phone in the image, the target feature information may include a device identification code or a device signal.

Herein, the target feature information is not enumerated herein. Different tracked targets each have corresponding target feature information, so as to accurately describe and identify a tracked target.

Step 353. Perform local feature construction and global feature construction on the trajectory segment according to the target feature information, to obtain local feature information and global feature information.

It is noted first that, the local feature information is used for accurately describing some trajectory segments through local feature construction of the trajectory segments.

Further, the local feature information is related to at least one target instance in a corresponding trajectory segment. For example, the local feature information is related to the first target instance and the last target instance in the corresponding trajectory segment.

Therefore, the local feature information may be defined by using the target feature information corresponding to the at least one target instance. For example, the target feature information includes a visual feature vector of a tracked target. In this case, a visual feature vector is extracted from the target feature information corresponding to the at least one target instance, and the visual feature vector is used as the local feature information.

In addition, the global feature information is used for accurately describing an entire trajectory segment through global feature construction of the trajectory segment.

Further, the global feature information is related to all target instances in a corresponding trajectory segment.

Therefore, the global feature information may be defined by using the target feature information corresponding to each target instance. Still using the foregoing example for description, the target feature information includes a structure feature vector of the tracked target. In this case, a structure feature vector is extracted from the target feature information respectively corresponding to the target instances, and the global feature information is obtained by using the structure feature vectors.

Step 355. Generate the trajectory segment feature information according to the local feature information and the global feature information.

As described above, the trajectory segment feature information is used for accurately describing an entire and/or a part of a trajectory segment. Therefore, after the local feature information and the global feature information are obtained, trajectory segment feature information including the local feature information and the global feature information can be correspondingly obtained.

The foregoing process provides sufficient basis for a clustering process in which the specified trajectory segments are correspondingly classified into different types according to the different tracked targets. That is, the trajectory segment feature information having extremely high similarity or even consistency is used for representing same tracked targets.

Further, in an exemplary embodiment, step 310 of performing target detection on the image data to obtain at least one target instance may include the following step:

performing annotation information identification on a plurality of deformable parts of a tracked target in the image data by using a pre-created deformable-part model, to obtain the at least one target instance.

A deformable part of the tracked target corresponding to the target instance is identified by using annotation information.

For the image data, target detection is performed by using the deformable-part model, where an obtained tracked target is a non-rigid target. The non-rigid target is a tracked target that deforms in a target tracking process, for example, a person, an animal, or another deformable object.

Specifically, the tracked target is represented by using the deformable-part model as a global rectangular frame and a plurality of part rectangular frames. The global means an entire tracked target, and the part means a deformable part of the tracked target.

Images annotated by the global rectangular frame and the part rectangular frames are defined as annotation information in the target instance, so that a plurality of deformable parts of the tracked target are identified by using a plurality of pieces of annotation information in the target instance.

Figure 5:
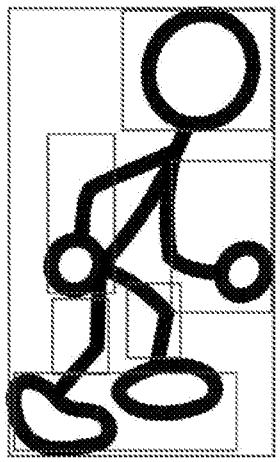
FIG. 5 is a schematic diagram of a target instance when a tracked target is a person according to this application.

In an example, the tracked target is a person. As shown in FIG. 5, the person is represented as one global rectangular frame and six part rectangular frames. The global means an entire person, and the part means a deformable part such as the head, the left hand, the right hand, the left leg, the right leg, the left foot and the right foot of the person. Correspondingly, the deformable part of the person is identified by using seven pieces of standard information in the target instance.

In an embodiment, a quantity of part rectangular frames may be flexibly adjusted to satisfy different requirements for target tracking accuracy in different application scenarios.

Figure 6:
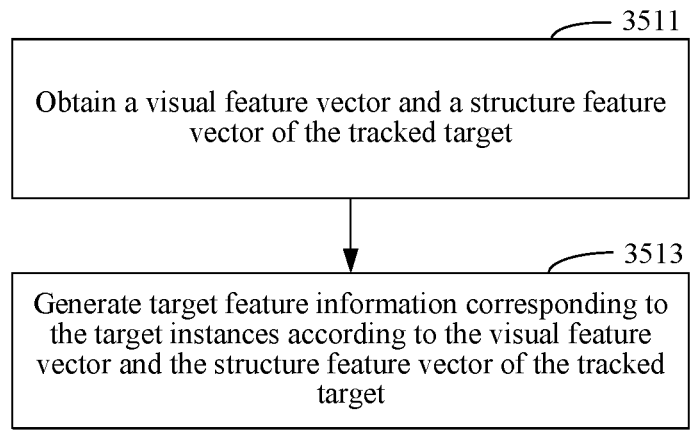
FIG. 6 is a flowchart of an embodiment of step 351 in the embodiment corresponding to FIG. 4.

Correspondingly, referring to FIG. 6, step 351 may include the following steps:

Step 3511. Obtain a visual feature vector and a structure feature vector of the tracked target.

Specifically, histogram feature vector extraction is performed on a plurality of pieces of annotation information, and an extracted histogram feature vector is used as the visual feature vector of the tracked target.

The histogram feature vector includes a histogram of oriented gradients feature vector and a color histogram feature vector. The histogram of oriented gradients feature vector is used for describing a texture feature of the tracked target, and the color histogram feature vector is used for describing a color feature of the tracked target.

In a histogram feature vector extraction process, histogram feature vector extraction is essentially performed on a deformable part identified by using a plurality of pieces of annotation information. For example, a person's head is identified by using the annotation information. In this case, histogram feature vector extraction is performed on an image annotated by using a part rectangular frame in which the person's head is located.

Based on this, the visual feature vector of the tracked target is defined by using an extracted histogram feature vector, thereby reflecting external appearance information of the tracked target.

For example, for one piece of the annotation information, the histogram of oriented gradients feature vector is a1, and the color histogram feature vector is b1. In this case, the visual feature vector is obtained by using the annotation information as {a1, b1}.

By analogy, as an amount of annotation information increases, a length of the visual feature vector generated by using the annotation information also correspondingly increases, thereby improving tracked target describing accuracy.

For example, a visual feature vector obtained by using eight pieces of annotation information is {a1, b1, a2, b2, a3, b3, a4, b4, a5, b5, a6, b6, a7, b7, a8, b8}.

A deformable part identified by using one of the plurality of pieces of annotation information is used as an anchor point to calculate location deviations between the anchor point and deformable parts identified by using remaining annotation information, and calculated deviation values are used as the structure feature vector of the tracked target.

Still using the foregoing example for description, the annotation information is used for identifying a deformable part of a person in the target instance. In an embodiment, the deformable part of the person is identified by using eight pieces of annotation information in the target instance. That is, an image annotated by using one global rectangular frame represents the head of the person, and images annotated by using seven part rectangular frames respectively represent parts of the left hand, the right hand, the body, the left leg, the right leg, the left food, and the right food of the person.

Herein, a person's head is used as an anchor point. There are seven deviation values obtained through calculation based on the person's head and remaining part of the person, so as to obtain a structure feature vector when the tracked target is a person, thereby reflecting internal structural information when the tracked target is the person.

For example, the deviation values are c1, c2, c3, c4, c5, c6, and c7 respectively. In this case, the structure feature vector is {c1, c2, c3, c4, c5, c6, c7}.

Step 3513. Generate target feature information corresponding to the target instances according to the visual feature vector and the structure feature vector of the tracked target.

After obtaining the visual feature vector and the structure feature vector of the tracked target, the target instance can be accurately described. That is, the target feature information corresponding to the target instance includes the visual feature vector and the structure feature vector of the tracked target, thereby uniquely identify, in a form of information, that the person is the tracked target.

In the foregoing process, the target feature information is used to reflect the external appearance information and the internal structural information of the tracked target, thereby accurately describing the tracked target, facilitating subsequent accurate target tracking.

Figure 7:
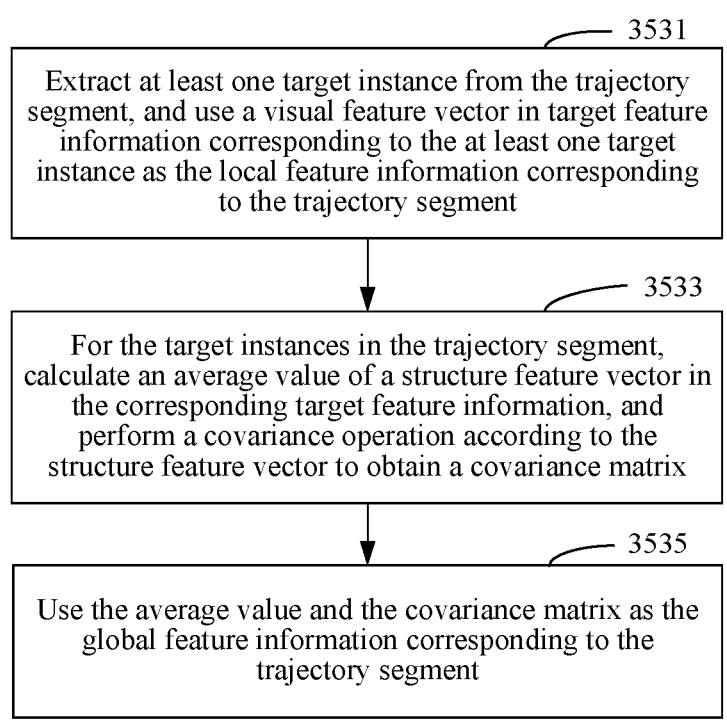
FIG. 7 is a flowchart of an embodiment of step 353 in the embodiment corresponding to FIG. 4.

Referring to FIG. 7, in an exemplary embodiment, step 353 may include the following steps:

Step 3531. Extract at least one target instance from the trajectory segment, and use a visual feature vector in target feature information corresponding to the at least one target instance as the local feature information corresponding to the trajectory segment.

As described above, the local feature information is related to at least one target instance in a corresponding trajectory segment. The local feature information may be defined by using the target feature information corresponding to the at least one target instance.

In an embodiment, the local feature information is related to the first target instance and the last target instance in the corresponding trajectory segment.

Specifically, the first target instance and the last target instance are extracted from the trajectory segment in chronological order, and the visual feature vector in the target feature information corresponding to the first target instance and the visual feature vector in the target feature information corresponding to the last target instance are obtained, so that the local feature information corresponding to the trajectory segment includes the foregoing visual feature vectors.

In this process, the local feature information may be regarded as accurate descriptions of the tracked target included in the at least one target instance in the trajectory segment. That is, accurate description of a part of the trajectory segment is implemented, facilitating subsequent accurate target tracking.

Step 3533. For the target instances in the trajectory segment, calculate an average value of a structure feature vector in the corresponding target feature information, and perform a covariance operation according to the structure feature vector to obtain a covariance matrix.

Step 3535. Use the average value and the covariance matrix as the global feature information corresponding to the trajectory segment.

As described above, the global feature information is related to all target instances in a corresponding trajectory segment. The global feature information may be defined by using the target feature information corresponding to each target instance.

Specifically, various structure feature vectors in the target feature information corresponding to all target instances are calculated for an average value and a covariance matrix, and the average value and the covariance matrix are defined as the global feature information corresponding to the trajectory segment.

The structure feature vectors in the target feature information corresponding to the target instances are used as elements, and elements in the covariance matrix are the covariance between the foregoing various elements.

In this process, all target instances in the trajectory segment are averaged and de-correlated by using the global feature information, thereby accurately describing an entire trajectory segment, facilitating subsequent accurate target tracking.

Figure 8:
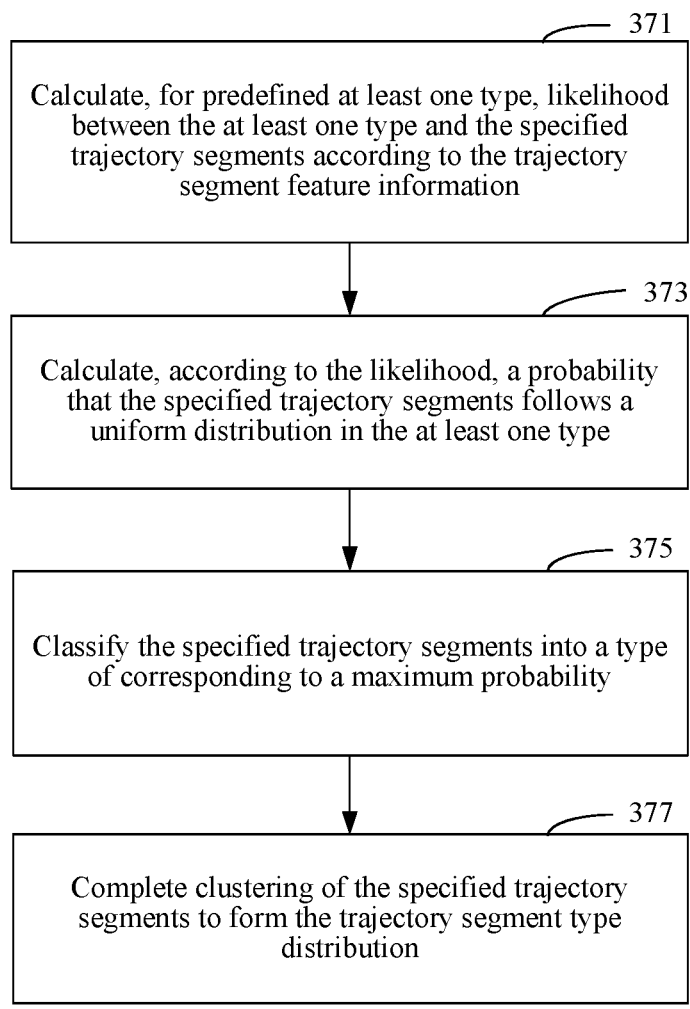
FIG. 8 is a flowchart of an embodiment of step 370 in the embodiment corresponding to FIG. 3.

Referring to FIG. 8, in an exemplary embodiment, step 370 may include the following steps:

Step 371. Calculate, for predefined at least one type, likelihood between the at least one type and the specified trajectory segments according to the trajectory segment feature information.

The type is a set of including at least one trajectory segment. In the set, target instances in all trajectory segments include same tracked target.

As described above, for extremely similar or even consistent trajectory segment feature information, target instances included in corresponding trajectory segments may be regarded as including a same tracked target, that is, the corresponding trajectory segments belong to a same type.

Otherwise, if a type of trajectory segments and the specified trajectory segments have extremely similar or even consistent trajectory segment feature information, the specified trajectory segments may possibly belongs to the type.

Therefore, before the trajectory segment clustering, the likelihood between each type of trajectory segments and the specified trajectory segments needs to be obtained according to the trajectory segment feature information, to learn whether extremely similar or even consistent trajectory segment feature information exists between the specified trajectory segments and each trajectory segment in the type.

Step 373. Calculate, according to the likelihood, a probability that the specified trajectory segments follows a uniform distribution in the at least one type.

It is noted that herein, after the likelihood between each type of trajectory segments and the specified trajectory segments is calculated, normalization processing is first performed on the calculated likelihood, to ensure all likelihood for probability calculating are of a same quantity level, thereby improving probability calculating accuracy, and further improving target tracking accuracy.

Step 375. Classify the specified trajectory segments into a type of corresponding to a maximum probability.

Step 377. Complete clustering of the specified trajectory segments to form the trajectory segment type distribution.

When the specified trajectory segments that need to be clustered are classified into a same type or different types, clustering is completed once. In this case, a clustering result is a trajectory segment type distribution.

Further, to improve target tracking accuracy, a plurality of times of clustering may be performed, and the last clustering result is used as a trajectory segment type distribution. A quantity of iterations of the clustering can be flexibly adjusted according to a requirement in an actual application scenario.

In an exemplary embodiment, before step 371, the method may further include the following steps:

for target instances included in a type of trajectory segments, determining whether a trajectory segment in the type of trajectory segments and the specified trajectory segments include target instances temporally overlapping with each other; and if the trajectory segment exists, setting likelihood between the type of trajectory segments and the specified trajectory segments to zero.

As described above, the target instances overlapping with each other in time are obtained from image data collected by image capturing devices at a same collection time. That is, these target instances are derived from the same image data.

It may be understood that same image data may include more than one tracked target. Correspondingly, after the target detection, a plurality of target instances containing different tracked targets may be obtained. The plurality of target instances are connected to form a plurality of trajectory segments, making it impossible that the trajectory segments belong to a same type.

Therefore, if the specified trajectory segments and a trajectory segment in one type have target instances that overlap with each other in time, it indicates that the specified trajectory segments cannot belong to the type. In other words, the likelihood between the type of trajectory segments and the specified trajectory segments is necessarily zero.

As can be seen from the above, if a trajectory segment in one type includes a target instance that overlap with a target instance in the specified trajectory segments in time, there is no need to calculate the likelihood between the type of trajectory segments and the specified trajectory segments, and the between the type of trajectory segments and the specified trajectory segments can be directly to set to zero.

In combination with the foregoing embodiment, exclusive constraints for the tracked target, that is, trajectory segments corresponding to different tracked targets in same image data belong to different types, providing a guarantee for target tracking accuracy simply and effectively.

Figure 9:
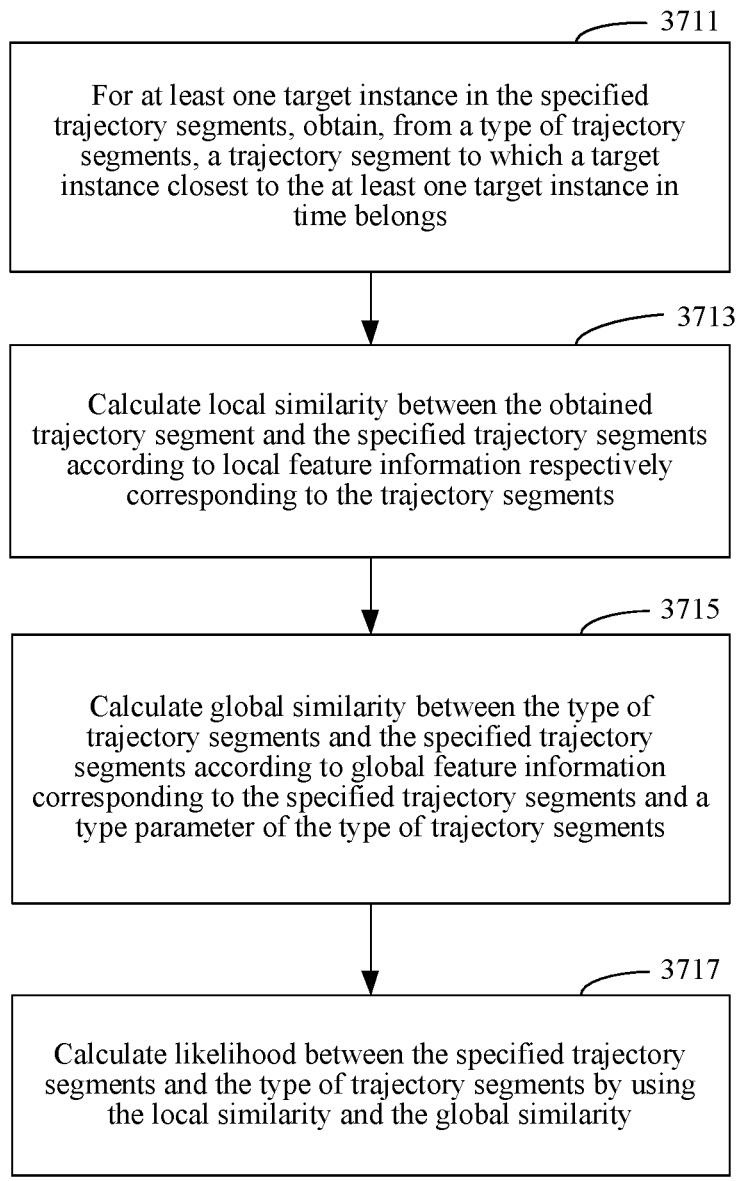
FIG. 9 is a flowchart of an embodiment of step 371 in the embodiment corresponding to FIG. 8.

Referring to FIG. 9, in an exemplary embodiment, step 371 may include the following steps:

Step 3711. For at least one target instance in the specified trajectory segment, obtain, from a type of trajectory segments, a trajectory segment to which a target instance closest to the at least one target instance in time belongs.

In an embodiment, the likelihood calculation is calculated by using the first and the last target instances in a specified trajectory segment.

It is understood that a connection of the target tracking result is carried out in chronological order of the trajectory segments. Therefore, each trajectory segment in a same type is bound to have a time sequence, and target instances in each trajectory segment also have a time sequence. In other words, the last target instance connected in the preceding trajectory segment is prior to the first target instance connected in the following trajectory segment on the time axis.

Correspondingly, in one type, a target instance closest to the first target instance in the specified trajectory segments in time is the last target instance in a trajectory segment of the type.

A target instance closest to the last target instance in the specified trajectory segments in time is the first target instance in a trajectory segment of the type.

Step 3713. Calculate local similarity between the specified trajectory segments and the obtained trajectory segment according to local feature information respectively corresponding to the trajectory segments.

It is noted that the trajectory segments are the specified trajectory segments and the obtained trajectory segment. Correspondingly, the local feature information corresponding to the trajectory segments respectively is local feature information of the specified trajectory segments and local feature information of the obtained trajectory segment.

Step 3715. Calculate global similarity between the type of trajectory segments and the specified trajectory segments according to global feature information corresponding to the specified trajectory segments and a type parameter of the type of trajectory segments.

Step 3717. Calculate likelihood between the type of trajectory segments and the specified trajectory segments by using the local similarity and the global similarity.

Specifically, for the specified trajectory segments and the type, the likelihood between them can be calculated as follows:

$$f(x_i|\Phi_k, x_{k,g}) \propto s(A_i^{head}, A_{k,m}^{tail}) s(A_i^{tail}, A_{k,n}^{head}) p(D_i, V_i; \Phi_k)$$

where f represents the likelihood between the type of trajectory segments and the specified trajectory segments; and $x_i$ represents an $i^{th}$ specified trajectory segment, $(\phi_k, x_{k,[\ ]})$ represents the type, the type is a $k^{th}$ type in the trajectory segment type distribution, and the $k^{th}$ type includes several trajectory segments, which is represented by [ ].

In the first term s, $A_i^{tail}$ represents a visual feature vector in target feature information corresponding to the first target instance in the $i^{th}$ specified trajectory segment, and $A_{k,n}^{head}$ represents a visual feature vector in target feature information corresponding to the last target instance in an $m^{th}$ trajectory segment of the $k^{th}$ type.

In the second term s, $A_i^{tail}$ represents a visual feature vector in target feature information corresponding to the last target instance in the $i^{th}$ specified trajectory segment, and $A_{k,n}^{head}$ head represents a visual feature vector in target feature information corresponding to the first target instance in an $n^{th}$ trajectory segment of the $k^{th}$ type.

In the third item p, $D_i$ and $V_i$ respectively represent an average value and a covariance matrix in the global feature information corresponding to the $i^{th}$ specified trajectory segment. $\phi_k$ is a type parameter of the $k^{th}$ type, where the type parameter is obtained from Gaussian model modeling by using an average value and a covariance matrix in the global feature information corresponding to all trajectory segments [ ] of the $k^{th}$ type.

Further, the function s represents calculation, for the foregoing two target instances, of similarity between histogram feature vectors in visual feature vectors corresponding to the two target instances. Then, all calculated histogram feature vectors are accumulated to obtain local similarity between the $i^{th}$ specified trajectory segment and the $m^{th}$ trajectory segment of the $k^{th}$ type and between the $i^{th}$ specified trajectory segment and the $n^{th}$ trajectory segment of the $k^{th}$ type. The histogram feature vector includes a histogram of oriented gradients feature vector and a color histogram feature vector.

The function p represents that Gaussian model modeling was carried out on an average value and a covariance matrix in the global feature information corresponding to all trajectory segments [ ] of the $k^{th}$ type and the $i^{th}$ specified trajectory segment, next a distance between the two Gaussian models obtained through the modeling was compared, and then comparison results are converted into global similarity between the specified trajectory segments and the type.

Further, after calculating the local similarity s1 between the $i^{th}$ specified trajectory segment and the $m^{th}$ trajectory segment of the $k^{th}$ type, the local similarity s2 between the $i^{th}$ specified trajectory segment and the $n^{th}$ trajectory segment of the $k^{th}$ type, and the global similarity p between the $i^{th}$ specified trajectory segment and the $k^{th}$ type, the likelihood f between the $i^{th}$ specified trajectory segment and the $k^{th}$ type can be calculated by using the foregoing formula.

In an exemplary embodiment, before step 377, the method may further include the following step:

determining whether an iteration quantity of the clustering satisfies a preset iteration threshold.

For example, the preset iteration threshold is set to 500 times. Certainly, the preset iteration threshold can be set flexibly according to an actual requirement. For example, to improve target tracking accuracy, the preset iteration threshold is increased, and to reduce processing pressure on the server, the preset iteration threshold is reduced.

If the quantity of iterations of the clustering satisfies the preset iteration threshold, the iterative process of the clustering is stopped and a result obtained through the last clustering is used as a trajectory segment type distribution, that is, step 377 is performed.

Otherwise, if the iteration quantity of the clustering does not satisfy the preset iteration threshold, type parameter update is triggered, and for at least one type for which a type parameter has been updated, likelihood between the at least one type and the specified trajectory segments is calculated according to the trajectory segment feature information. That is, step 371 is returned to, until the iteration quantity of the clustering satisfies the preset iteration threshold.

In addition, according to different application scenarios, the stop condition of the cyclic iteration can be flexibly set, or the cyclic iteration can be stopped when a calculation time reaches a preset calculation time, or the cyclic iteration is stopped when a clustering result remains unchanged.

Under the action of the foregoing embodiment, clustering accuracy is improved through cyclic iteration, making tracked targets based on a target tracking result more consistent, thereby improving target tracking accuracy.

The following is an apparatus embodiment in this application. The apparatus may be configured to implement the target tracking method in this application. For details not disclosed in the apparatus embodiment in this application, refer to the embodiment of the target tracking method in this application.

Figure 10:
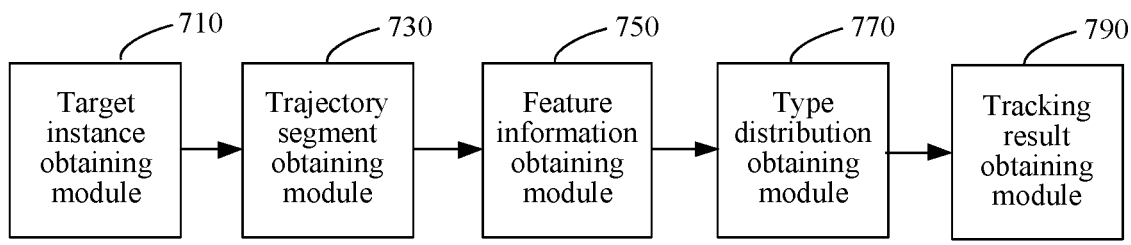
FIG. 10 is a block diagram of a target tracking apparatus according to an exemplary embodiment.

Referring to FIG. 10, in an exemplary embodiment, a target tracking apparatus 700 includes, but is not limited to, a target instance obtaining module 710, a trajectory segment obtaining module 730, a feature information obtaining module 750, a type distribution obtaining module 770, and a tracking result obtaining module 790.

The target instance obtaining module 710 is configured to: obtain image data, and perform target detection on the image data to obtain at least one target instance. Each target instance corresponds to one tracked target.

The trajectory segment obtaining module 730 is configured to: search the at least one target instance for target instances including a same tracked target, and connect the target instances including the same tracked target to form a trajectory segment.

The feature information obtaining module 750 is configured to perform feature construction on the trajectory segment by using the target instances in the trajectory segment, to obtain trajectory segment feature information.

The type distribution obtaining module 770 is configured to perform clustering on specified trajectory segments according to the trajectory segment feature information, to obtain a trajectory segment type distribution.

The tracking result obtaining module 790 is configured to connect trajectory segments of a same type in the trajectory segment type distribution to form a target tracking result.

Figure 11:
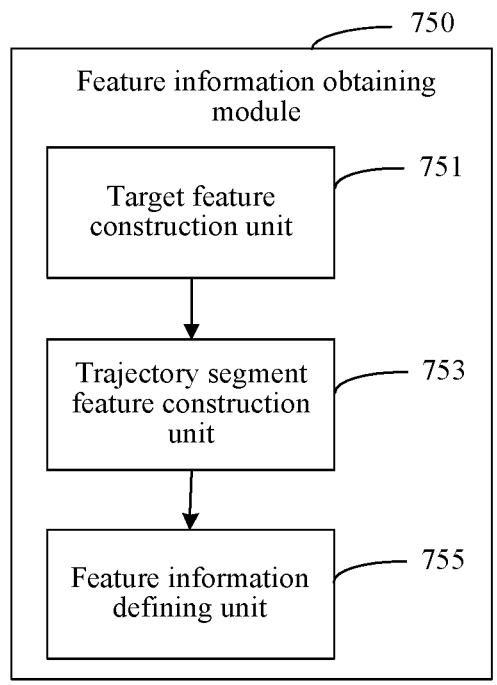
FIG. 11 is a block diagram of an embodiment of a feature information obtaining module 750 in the embodiment corresponding to FIG. 10.

Referring to FIG. 11, in an exemplary embodiment, the feature information obtaining module 750 includes, but is not limited to, a target feature construction unit 751, a trajectory segment feature construction unit 753, and a feature information defining unit 755.

The target feature construction unit 751 is configured to perform target feature construction on the target instances in the trajectory segment, to obtain target feature information.

The trajectory segment feature construction unit 753 is configured to perform local feature construction and global feature construction on the trajectory segment according to the target feature information, to obtain local feature information and global feature information.

The feature information defining unit 755 is configured to generate the trajectory segment feature information according to the local feature information and the global feature information.

In an exemplary embodiment, the target instance obtaining module includes an annotation information identification unit.

The annotation information identification unit is configured to perform annotation information identification on a plurality of deformable parts of a tracked target in the image data by using a pre-created deformable-part model, to obtain the at least one target instance. A deformable part of the tracked target corresponding to the target instance is identified by using annotation information.

Figure 12:
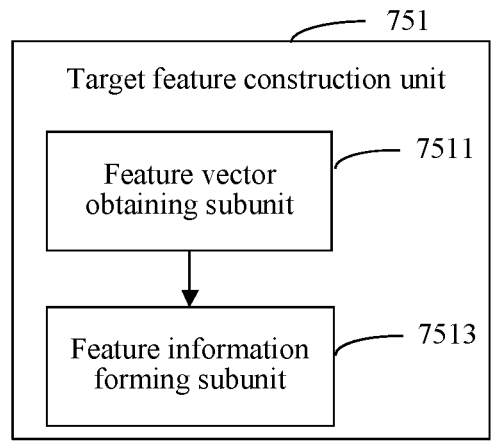
FIG. 12 is a block diagram of an embodiment of a target feature construction unit 751 in the embodiment corresponding to FIG. 11.

Correspondingly, referring to FIG. 12, the target feature construction unit 751 includes, but is not limited to, a feature vector obtaining subunit 7511 and a feature information forming subunit 7513.

The feature vector obtaining subunit 7511 is configured to obtain a visual feature vector and a structure feature vector of the tracked target.

Specifically, histogram feature vector extraction is performed on a plurality of pieces of annotation information, and an extracted histogram feature vector is used as the visual feature vector of the tracked target. A deformable part identified by using one of the plurality of pieces of annotation information is used as an anchor point to respectively calculate location deviations between the anchor point and deformable parts identified by using remaining annotation information, and calculated deviation values are used as the structure feature vector of the tracked target.

The feature information forming subunit 7513 is configured to generate target feature information corresponding to the target instances according to the visual feature vector and the structure feature vector of the tracked target.

Figure 13:
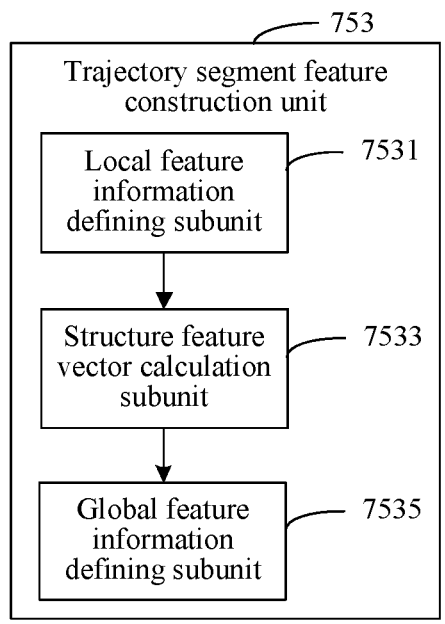
FIG. 13 is a block diagram of an embodiment of a trajectory segment feature construction unit 753 in the embodiment corresponding to FIG. 11.

Referring to FIG. 13, in an exemplary embodiment, the trajectory segment feature construction unit 753 includes, but is not limited to, a local feature information defining subunit 7531, a structure feature vector calculation subunit 7533, and a global feature information defining subunit 7535.

The local feature information defining subunit 7531 is configured to: extract at least one target instance from the trajectory segment, and use a visual feature vector in target feature information corresponding to the at least one target instance as the local feature information corresponding to the trajectory segment.

The structure feature vector calculation subunit 7533 is configured to: for the target instances in the trajectory segment, calculate an average value of a structure feature vector in the corresponding target feature information, and perform a covariance operation according to the structure feature vector to obtain a covariance matrix.

The global feature information defining subunit 7535 is configured to use the average value and the covariance matrix as the global feature information corresponding to the trajectory segment.

Figure 14:
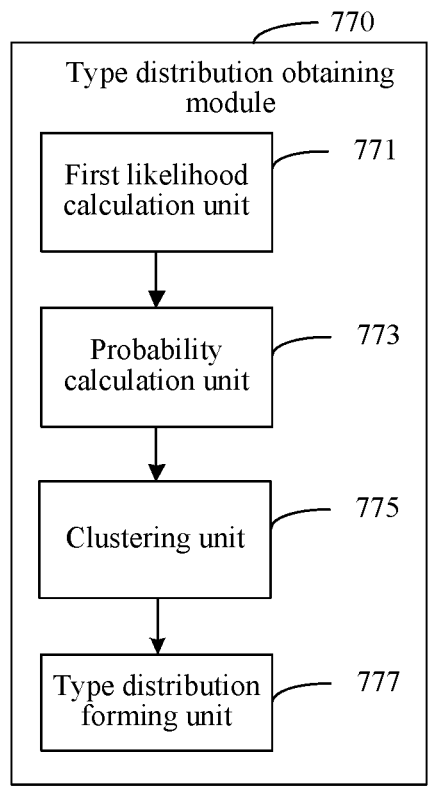
FIG. 14 is a block diagram of an embodiment of a type distribution obtaining module 770 in the embodiment corresponding to FIG. 10.

Referring to FIG. 14, in an exemplary embodiment, the type distribution obtaining module 770 includes, but is not limited to, a first likelihood calculation unit 771, a probability calculation unit 773, a clustering unit 775, and a type distribution forming unit 777.

The first likelihood calculation unit 771 is configured to calculate, for predefined at least one type, likelihood between the at least one type and the specified trajectory segments according to the trajectory segment feature information.

The probability calculation unit 773 is configured to calculate, according to the likelihood, a probability that the specified trajectory segments follows a uniform distribution in the at least one type.

The clustering unit 775 is configured to classify the specified trajectory segments into a type of corresponding to a maximum probability.

The type distribution forming unit 777 is configured to complete clustering of the specified trajectory segments to form the trajectory segment type distribution.

Figure 15:
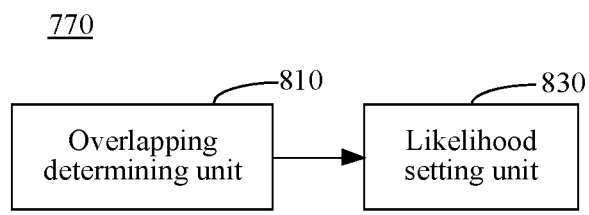
FIG. 15 is a block diagram of another embodiment of a type distribution obtaining module 770 in the embodiment corresponding to FIG. 10.

Referring to FIG. 15, in an exemplary embodiment, the type distribution obtaining module 770 further includes, but is not limited to, an overlapping determining unit 810 and a likelihood setting unit 830.

The overlapping determining unit 810 is configured to: for target instances included in a type of trajectory segments, determine whether a trajectory segment in the type of trajectory segments and the specified trajectory segments include target instances temporally overlapping with each other. If the trajectory segment exists, the likelihood setting unit is notified.

The likelihood setting unit 830 is configured to set likelihood between the type of trajectory segments and the specified trajectory segments to zero.

Figure 16:
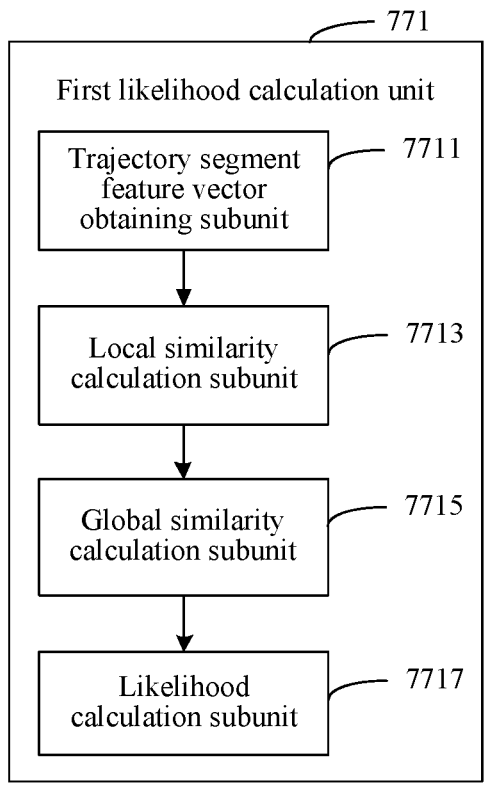
FIG. 16 is a block diagram of an embodiment of a first likelihood calculation unit 771 in the embodiment corresponding to FIG. 15.

Referring to FIG. 16, in an exemplary embodiment, the first likelihood calculation unit 771 includes, but is not limited to, a trajectory segment feature vector obtaining subunit 7711, a local similarity calculation subunit 7713, a global similarity calculation subunit 7715, and a likelihood calculation subunit 7717.

The trajectory segment feature vector obtaining subunit 7711 is configured to: for at least one target instance in the specified trajectory segment, obtain, from a type of trajectory segments, a trajectory segment to which a target instance closest to the at least one target instance in time belongs.

The local similarity calculation subunit 7713 is configured to calculate local similarity between the specified trajectory segments and the obtained trajectory segment according to local feature information respectively corresponding to the trajectory segments.

The global similarity calculation subunit 7715 is configured to calculate global similarity between the type of trajectory segments and the specified trajectory segments according to global feature information corresponding to the specified trajectory segments and a type parameter of the type of trajectory segments.

The likelihood calculation subunit 7717 is configured to calculate likelihood between the type of trajectory segments and the specified trajectory segments by using the local similarity and the global similarity.

Figure 17:
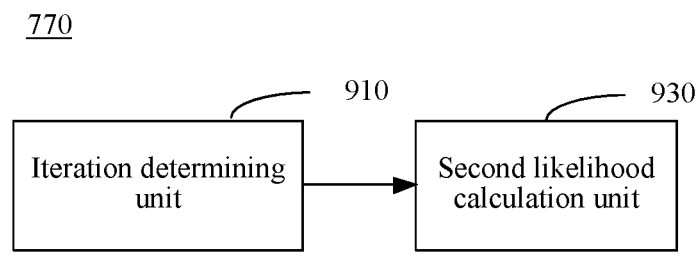
FIG. 17 is a block diagram of another embodiment of a type distribution obtaining module 770 in the embodiment corresponding to FIG. 10.

Referring to FIG. 17, in an exemplary embodiment, the type distribution obtaining module 770 further includes, but is not limited to, an iteration determining unit 910 and a second likelihood calculation unit 930.

The iteration determining unit 910 is configured to determine whether an iteration quantity of the clustering satisfies a preset iteration threshold. If the iteration quantity of the clustering does not satisfy the preset iteration threshold, the second likelihood calculation unit is notified.

The second likelihood calculation unit 930 is configured to: trigger to perform type parameter update, and for at least one type for which a type parameter has been updated, calculate likelihood between the at least one type and the specified trajectory segments according to the trajectory segment feature information.

It is noted that, when the target tracking apparatus provided in the foregoing embodiment performs target tracking, the divisions of the foregoing functional modules are described by using an example. During actual application, the foregoing functions may be allocated to and completed by different functional modules according to requirements, that is, the internal structure of the target tracking apparatus is divided into different functional modules, to complete all or some of the foregoing described functions.

In addition, the target tracking apparatus provided in the foregoing embodiment and the embodiment of the target tracking method belong to a same ideal. Specific operations manners of the modules have been described in detail in the method embodiment, and the details are not described herein again.

In an exemplary embodiment, an electronic device includes one or more processors and one or more memories.

The memory can be a non-transitory computer-readable medium that stores computer-readable instructions, the computer-readable instructions, when executed by the processor, implementing the target tracking method in the foregoing embodiment.

In an exemplary embodiment, a computer-readable storage medium stores a computer program, the computer program, when executed by a processor, implementing the target tracking method in the foregoing embodiment.

The foregoing descriptions are exemplary embodiments of this application, and are not intended to limit the embodiments of this application. A person of ordinary skill in the art can make corresponding modifications and variations with ease without departing from the spirit and scope of the embodiments of this application. Therefore, the protection scope of this application shall be subject to the protection scope of the claims.

What is claimed is:

1. A target tracking method, comprising:
obtaining, by processing circuitry of an apparatus and according to a target detection on image data, a plurality of target instances, each of the plurality of target instances corresponding to one of a plurality of tracked targets;
determining, by the processing circuitry, a plurality of trajectory segments, each of the plurality of trajectory segments indicating a trajectory of a subset of the target instances corresponding to a same tracked target of the plurality of tracked targets;
determining, by the processing circuitry, feature information of the plurality of trajectory segments;
classifying, by the processing circuitry, a type of each specified trajectory segment of the plurality of trajectory segments into one of a plurality of predefined types of trajectory segment according to the feature information of the respective specified trajectory segment, the one of the plurality of predefined types of trajectory segment corresponding to a maximum probability in a plurality of probabilities of the respective specified trajectory segment that follows a uniform distribution, and each of the plurality of probabilities corresponding to a respective one of the plurality of predefined types of trajectory segment; and
determining, by the processing circuitry and according to the types of the specified trajectory segments, a target tracking result including a same type of the specified trajectory segments.

2. The method according to claim 1, wherein the determining the feature information of the plurality of trajectory segments comprises:
determining, by the processing circuitry, target feature information of the target instances associated with one of the plurality of trajectory segments;
determining, by the processing circuitry and according to the target feature information, local feature information and global feature information of the target instances associated with the one of the plurality of trajectory segments; and
determining, by the processing circuitry, the feature information of the one of the plurality of trajectory segments according to the local feature information and the global feature information.

3. The method according to claim 2, wherein
the obtaining the plurality of target instances includes
obtaining, by the processing circuitry, one of the plurality of target instances according to annotation information of a plurality of deformable parts of a tracked target of the plurality of tracked targets in the image data, the tracked target corresponding to the one of the plurality of target instances; and
the determining the target feature information of the target instances associated with the one of the plurality of trajectory segments includes
obtaining, by the processing circuitry and for one of the target instances associated with the one of the plurality of trajectory segments, a visual feature vector and a structure feature vector of the tracked target corresponding to the one of the target instances, the visual feature vector being a histogram feature vector that is extracted from the annotation information of the plurality of deformable parts of the tracked target, and the structure feature vector being based on location deviation values between one of the plurality of deformable parts and another one of the plurality of deformable parts of the tracked target, and
determining, by the processing circuitry, the target feature information of the one of the target instances according to the visual feature vector and the structure feature vector of the tracked target corresponding to the one of the target instances.

4. The method according to claim 3, wherein the determining the local feature information and the global feature information of the target instances associated with the one of the plurality of trajectory segments comprises:
determining, by the processing circuitry, the local feature information according to the visual feature vector of the tracked target corresponding to the one of the target instances associated with the one of the plurality of trajectory segments;
determining, by the processing circuitry, an average value of structure feature vectors and a covariance matrix of the structure feature vectors, the structure feature vectors corresponding to the target instances associated with the one of the plurality of trajectory segments; and
determining, by the processing circuitry, the global feature information according to the average value and the covariance matrix of the structure feature vectors.

5. The method according to claim 1, wherein the classifying comprises:
calculating, by the processing circuitry and for each of the plurality of predefined types of trajectory segment, a likelihood between the respective predefined type of trajectory segment and one of the specified trajectory segments according to the feature information of the one of the specified trajectory segments;
calculating, by the processing circuitry and according to the likelihoods between the plurality of predefined types of trajectory segment and the one of the specified trajectory segments, the plurality of probabilities of the one of the specified trajectory segments that follows the uniform distribution, each of the plurality of probabilities corresponding to a respective one of the plurality of predefined types of trajectory segment; and
classifying, by the processing circuitry, the one of the specified trajectory segments into the one of the plurality of predefined types corresponding to the maximum probability in the plurality of probabilities.

6. The method according to claim 5, wherein before the calculating the likelihood between the respective predefined type of trajectory segment and the one of the specified trajectory segments, the method further comprises:
- determining, by the processing circuitry, whether a first target instance associated with the respective predefined type of trajectory segment and a second target instance associated with the one of the specified trajectory segments overlap in time; and
- determining, by the processing circuitry, the likelihood between the respective predefined type of trajectory segment and the one of the specified trajectory segments to be zero when the first target instance and the second target instance are determined to overlap in time.

7. The method according to claim 5, wherein the calculating the likelihood between the respective predefined type of trajectory segment and the one of the specified trajectory segments comprises:
- obtaining, by the processing circuitry, a predefined trajectory segment associated with the respective predefined type of trajectory segment, a first target instance associated with the predefined trajectory segment being closest in time to a second target instance associated with the one of the specified trajectory segments;
- calculating, by the processing circuitry, a local similarity between the one of the specified trajectory segments and the predefined trajectory segment associated with the respective predefined type of trajectory segment according to local feature information of the one of the specified trajectory segments and local feature information of the predefined trajectory segment associated with the respective predefined type of trajectory segment;
- calculating, by the processing circuitry, a global similarity between the respective predefined type of trajectory segment and the one of the specified trajectory segments according to the global feature information of the one of the specified trajectory segments and a type parameter of the respective predefined type of trajectory segment; and
- calculating, by the processing circuitry, the likelihood between the respective predefined type of trajectory segment and the one of the specified trajectory segments according to the local similarity and the global similarity.

8. The method according to claim 7, further comprising:
- determining, by the processing circuitry, whether an iteration quantity of the classifying satisfies a preset iteration threshold;
- updating, by the processing circuitry, the type parameter of the respective predefined type of trajectory segment when the iteration quantity of the classifying is determined not to satisfy the preset iteration threshold; and
- calculating, by the processing circuitry, a likelihood between the updated respective predefined type of trajectory segment and the one of the specified trajectory segments according to the feature information of the one of the specified trajectory segments.

9. A target tracking apparatus, comprising processing circuitry configured to:
- obtain, according to a target detection on image data, a plurality of target instances, each of the plurality of target instances corresponding to one of a plurality of tracked targets;
- determine a plurality of trajectory segments, each of the plurality of trajectory segments indicating a trajectory of a subset of the target instances corresponding to a same tracked target of the plurality of tracked targets;
- determine feature information of the plurality of trajectory segments;
- classify a type of each specified trajectory segment of the plurality of trajectory segments into one of a plurality of predefined types of trajectory segment according to the feature information of the respective specified trajectory segment, the one of the plurality of predefined types of trajectory segment corresponding to a maximum probability in a plurality of probabilities of the respective specified trajectory segment that follows a uniform distribution, and each of the plurality of probabilities corresponding to a respective one of the plurality of predefined types of trajectory segment; and
- determine, according to the types of the specified trajectory segments, a target tracking result including a same type of the specified trajectory segments.

10. The apparatus according to claim 9, wherein the processing circuitry is further configured to:
- determine target feature information of the target instances associated with one of the plurality of trajectory segments;
- determine, according to the target feature information, local feature information and global feature information of the target instances associated with the one of the plurality of trajectory segments; and
- determine the feature information of the one of the plurality of trajectory segments according to the local feature information and the global feature information.

11. The apparatus according to claim 10, wherein the processing circuitry is further configured to:
- obtain one of the plurality of target instances according to annotation information of a plurality of deformable parts of a tracked target of the plurality of tracked targets in the image data, the tracked target corresponding to the one of the plurality of target instances;
- obtain, for one of the target instances associated with the one of the plurality of trajectory segments, a visual feature vector and a structure feature vector of the tracked target corresponding to the one of the target instances, the visual feature vector being a histogram feature vector that is extracted from the annotation information of the plurality of deformable parts of the tracked target, and the structure feature vector being based on location deviation values between one of the plurality of deformable parts and another one of the plurality of deformable parts of the tracked target; and
- determine the target feature information of the one of the target instances according to the visual feature vector and the structure feature vector of the tracked target corresponding to the one of the target instances.

12. The apparatus according to claim 11, wherein the processing circuitry is further configured to:
- determine the local feature information according to the visual feature vector of the tracked target corresponding to the one of the target instances associated with the one of the plurality of trajectory segments;
- determine an average value of structure feature vectors and a covariance matrix of the structure feature vectors, the structure feature vectors corresponding to the target instances associated with the one of the plurality of trajectory segments; and
- determine the global feature information according to the average value and the covariance matrix of the structure feature vectors.

13. The apparatus according to claim 9, wherein the processing circuitry is further configured to:
- calculate, for each of the plurality of predefined types of trajectory segment, a likelihood between the respective predefined type of trajectory segment and one of the specified trajectory segments according to the feature information of the one of the specified trajectory segments;
- calculate, according to the likelihoods between the plurality of predefined types of trajectory segment and the one of the specified trajectory segments, the plurality of probabilities of the one of the specified trajectory segments that follows the uniform distribution, each of the plurality of probabilities corresponding to a respective one of the plurality of predefined types of trajectory segment; and
- classify the one of the specified trajectory segments into the one of the plurality of predefined types corresponding to the maximum probability in the plurality of probabilities.

14. The apparatus according to claim 13, wherein the processing circuitry is further configured to:
- determine whether a first target instance associated with the respective predefined type of trajectory segment and a second target instance associated with the one of the specified trajectory segments overlap in time; and
- determine the likelihood between the respective predefined type of trajectory segment and the one of the specified trajectory segments to be zero when the first target instance and the second target instance are determined to overlap in time.

15. The apparatus according to claim 13, wherein the processing circuitry is further configured to:
- obtain a predefined trajectory segment associated with the respective predefined type of trajectory segment, a first target instance associated with the predefined trajectory segment being closest in time to a second target instance associated with the one of the specified trajectory segments;
- calculate a local similarity between the one of the specified trajectory segments and the predefined trajectory segment associated with the respective predefined type of trajectory segment according to local feature information of the one of the specified trajectory segments and local feature information of the predefined trajectory segment associated with the respective predefined type of trajectory segment;
- calculate a global similarity between the respective predefined type of trajectory segment and the one of the specified trajectory segments according to the global feature information of the one of the specified trajectory segments and a type parameter of the respective predefined type of trajectory segment; and
- calculate the likelihood between the respective predefined type of trajectory segment and the one of the specified trajectory segments according to the local similarity and the global similarity.

16. The apparatus according to claim 15, wherein the processing circuitry is further configured to:
- determine whether an iteration quantity of the classifying satisfies a preset iteration threshold;
- update the type parameter of the respective predefined type of trajectory segment when the iteration quantity of the classifying is determined not to satisfy the preset iteration threshold; and
- calculate a likelihood between the updated respective predefined type of trajectory segment and the one of the specified trajectory segments according to the feature information of the one of the specified trajectory segments.

17. A non-transitory computer-readable medium storing a program executable by at least one processor to perform:
- obtaining, according to a target detection on image data, a plurality of target instances, each of the plurality of target instances corresponding to one of a plurality of tracked targets;
- determining a plurality of trajectory segments, each of the plurality of trajectory segments indicating a trajectory of a subset of the target instances corresponding to a same tracked target of the plurality of tracked targets;
- determining feature information of the plurality of trajectory segments;
- classifying a type of each specified trajectory segment of the plurality of trajectory segments into one of a plurality of predefined types of trajectory segment according to the feature information of the respective specified trajectory segment, the one of the plurality of predefined types of trajectory segment corresponding to a maximum probability in a plurality of probabilities of the respective specified trajectory segment that follows a uniform distribution, and each of the plurality of probabilities corresponding to a respective one of the plurality of predefined types of trajectory segment; and
- determining, according to the types of the specified trajectory segments, a target tracking result including a same type of the specified trajectory segments.

18. The non-transitory computer-readable storage medium according to claim 17, wherein the program is executable by the at least one processor to perform:
- determining target feature information of the target instances associated with one of the plurality of trajectory segments;
- determining, according to the target feature information, local feature information and global feature information of the target instances associated with the one of the plurality of trajectory segments; and
- determining the feature information of the one of the plurality of trajectory segments according to the local feature information and the global feature information.

19. The non-transitory computer-readable storage medium according to claim 18, wherein the program is executable by the at least one processor to perform:
- obtaining one of the plurality of target instances according to annotation information of a plurality of deformable parts of a tracked target of the plurality of tracked targets in the image data, the tracked target corresponding to the one of the plurality of target instances;
- obtaining, for one of the target instances associated with the one of the plurality of trajectory segments, a visual feature vector and a structure feature vector of the tracked target corresponding to the one of the target instances, the visual feature vector being a histogram feature vector that is extracted from the annotation information of the plurality of deformable parts of the tracked target, and the structure feature vector being based on location deviation values between one of the plurality of deformable parts and another one of the plurality of deformable parts of the tracked target; and
- determining the target feature information of the one of the target instances according to the visual feature vector and the structure feature vector of the tracked target corresponding to the one of the target instances.

20. The non-transitory computer-readable storage medium according to claim 19, wherein the program is executable by the at least one processor to perform:
- determining the local feature information according to the visual feature vector of the tracked target corresponding to the one of the target instances associated with the one of the plurality of trajectory segments;
- determining an average value of structure feature vectors and a covariance matrix of the structure feature vectors, the structure feature vectors corresponding to the target instances associated with the one of the plurality of trajectory segments; and
- determining the global feature information according to the average value and the covariance matrix of the structure feature vectors.

* * * * *